United States Patent Office.

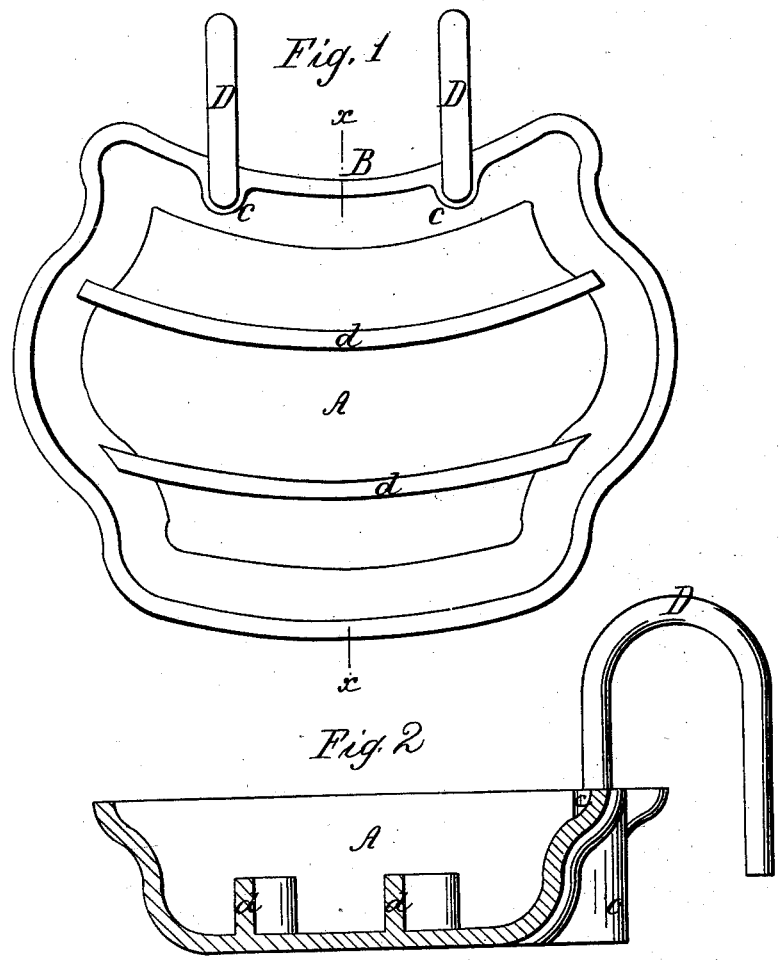

JOSEPH G. HARRISON, OF NEW YORK, N. Y.

Letters Patent No. 80,408, dated July 28, 1868.

IMPROVED SOAP-CUP.

*The Schedule referred to in these Letters Patent and making part of the same.*

TO ALL WHOM IT MAY CONCERN:

Be it known that I, JOSEPH G. HARRISON, of the city, county, and State of New York, have invented a new and useful "Soap-Cup" for wash-tub use; and I do hereby declare that the following is a full, clear, and exact description thereof, reference being made to the accompanying drawing, through letters of reference marked thereon, forming part of this specification, and in which—

Figure 1 represents a plan or top view of the soap-cup, and

Figure 2 a section taken on the line $x\ x$ of fig. 1.

The object of my invention is to furnish a cheap, durable, and convenient article for suspension on the side of a wash-tub, and that may be equally convenient for use on a table or stand, and it consists of a cup, of cast iron or other suitable metal, of any convenient shape, and having one side curved inwardly, to correspond, or thereabouts, with the curve of the exterior of the wash-tub, and provided with one or more hooks for suspending it on the side thereof.

To enable others to make and use my invention, I will describe its construction and application, by referring to the drawing, in which the same letters occurring on both figures indicate like parts.

The cup A is made of suitable size to hold a convenient lump of soap, and about one inch in depth, more or less, the bottom of which is made flat, so that it will sit steadily on a table, and one portion, B, of its periphery is curved inwardly to correspond, or thereabouts, with the curve of the circumference of the wash-tub. In this curved portion are formed one or more swells, $c$, in the casting, which are afterwards drilled, and a short rod of stout wire, say, about three-sixteenths of an inch in diameter, and four and a half or five inches long, is screwed into each swell, or these rods may be inserted in the mould, and the cup cast on to them; they are then bent, at about their mid-length, forming a hook or hooks, D, of such spread as will span the thickness of an ordinary tub, and by which the cup may be suspended, on the outside thereof, near the top.

In the bottom of this cup I form two or more ribs, $d$, which are cast solid with the cup, and of suitable height to support the soap and prevent it from dissolving away in the water that drains from it into the cup; the whole forming a cheap, serviceable, and convenient article for family use.

Having thus described my invention, I do not claim broadly a soap-cup for suspension on the edge of a wash-tub; but

What I claim, and desire to secure by Letters Patent, is—

A new article of manufacture, consisting of the cast-metal soap-cup A, constructed with a hollow curved side, B, a hook or hooks, D, and ribs $d$, substantially as shown and described.

JOSEPH G. HARRISON.

Witnesses:
W. MORRIS SMITH,
SYDNEY E. SMITH.